US012805552B2

(12) United States Patent
Matsuyama

(10) Patent No.: US 12,805,552 B2
(45) Date of Patent: Nov. 24, 2026

(54) GRANULAR SOLID COMPOSITION

(71) Applicant: Mitsubishi Corporation Life Sciences Limited, Tokyo (JP)

(72) Inventor: Yusuke Matsuyama, Tokyo (JP)

(73) Assignee: Mitsubishi Corporation Life Sciences Limited, Tokyo (JP)

(*) Notice: Subject to any disclaimer, the term of this patent is extended or adjusted under 35 U.S.C. 154(b) by 296 days.

(21) Appl. No.: 18/279,376

(22) PCT Filed: Feb. 28, 2022

(86) PCT No.: PCT/JP2022/008267
§ 371 (c)(1),
(2) Date: Aug. 29, 2023

(87) PCT Pub. No.: WO2022/186129
PCT Pub. Date: Sep. 9, 2022

(65) Prior Publication Data

US 2024/0196948 A1 Jun. 20, 2024

(30) Foreign Application Priority Data

Mar. 1, 2021 (JP) ................................ 2021-031317

(51) Int. Cl.
*A23L 29/269* (2016.01)
*A23J 3/14* (2006.01)
*A23J 3/22* (2006.01)

(52) U.S. Cl.
CPC ............... *A23L 29/271* (2016.08); *A23J 3/14* (2013.01); *A23J 3/227* (2013.01)

(58) Field of Classification Search
CPC . A23J 3/14; A23J 3/227; A23L 29/271; A23L 5/10; A23L 3/10; A23L 13/40; A23L 29/269
USPC .......................................................... 426/574
See application file for complete search history.

(56) References Cited

U.S. PATENT DOCUMENTS

2018/0343894 A1 12/2018 Lammers et al.

FOREIGN PATENT DOCUMENTS

| | | |
|---|---|---|
| EP | 4445747 | 10/2024 |
| JP | 05123129 | 5/1993 |
| JP | 0698698 | 4/1994 |
| JP | 0866163 | 3/1996 |
| JP | 0880166 | 3/1996 |
| JP | 2000166490 | 6/2000 |

(Continued)

OTHER PUBLICATIONS

Clark et al. Structural and mechanical properties of biopolymer gels. Food Hydrocolloids 1,17-38 (1987) (Year: 1987).*

(Continued)

*Primary Examiner* — Subbalakshmi Prakash
(74) *Attorney, Agent, or Firm* — EVAN LAW GROUP LLC

(57) ABSTRACT

An object of the present invention is to provide a method for producing a granular solid composition that can be used as a replacement for a Soboro-like food, has non-uniform granule sizes, and has particle surface asperities. The granular solid composition is produced by solidifying a liquid or sol composition comprising curdlan by heating on a surface with stirring. The liquid or sol composition comprising curdlan may comprise a microbe-derived and/or plant-derived protein.

8 Claims, 1 Drawing Sheet

(56) References Cited

FOREIGN PATENT DOCUMENTS

| | | |
|---|---|---|
| JP | 2009125010 | 6/2009 |
| JP | 2017169488 | 9/2017 |
| JP | 6963707 | 11/2021 |
| WO | 2019/209939 | 10/2019 |

OTHER PUBLICATIONS

Clark et al. Structural and mechanical properties of biopolymer gels. Advances in Polymer Science 83, 57-192. (1987) pp. 137. (Year 1987).*

Burey et .al. Critical Reviews in Food Science and Nutrition 48:361-377 (2008) pp. 361-363. (Year 2008).*

European Search Report dated Feb. 9, 2026 for EP application No. 22 763 185.0-1105.

* cited by examiner

[Fig. 1]
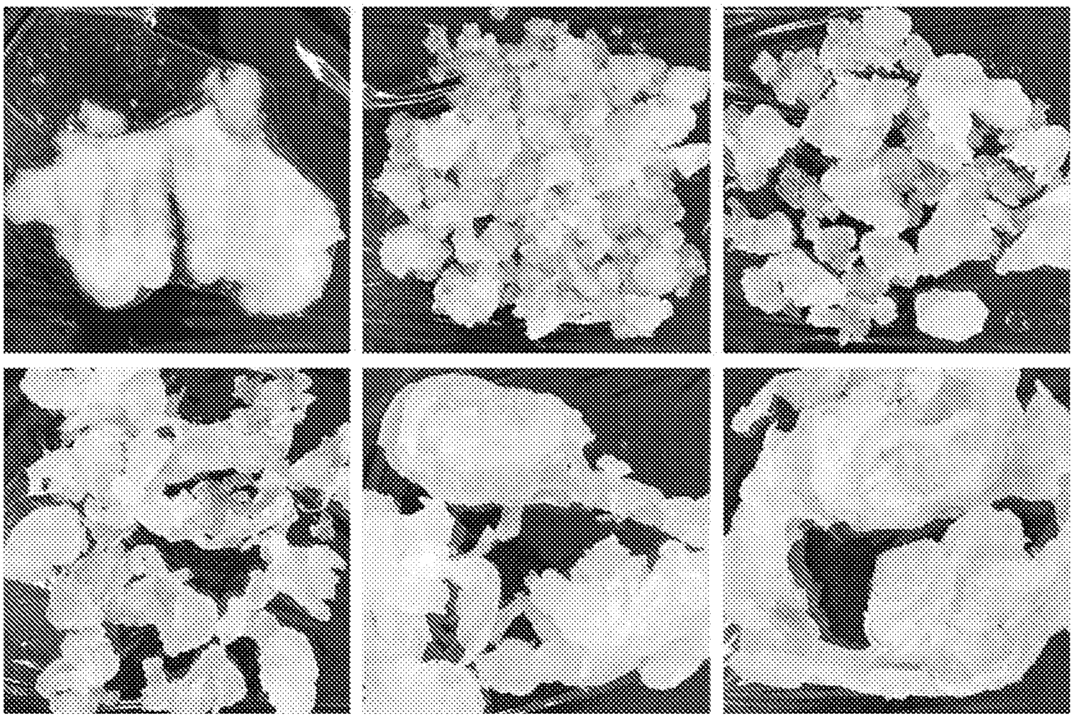
[Fig. 2]
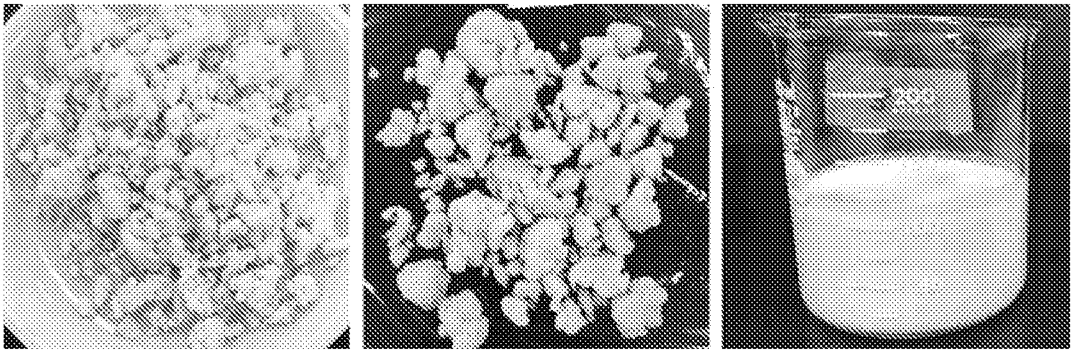

GRANULAR SOLID COMPOSITION

TECHNICAL FIELD

The present invention relates to a method for producing a granular solid food comprising curdlan, particularly, a granular solid composition that has non-uniform particle sizes, has particle surface asperities, and can be used as a replacement for a Soboro (minced or ground meat, fish, or egg cooked into fine crumbled pieces)-like food.

BACKGROUND ART

Soboro-like foods are cooking ingredients that are often used at home or in processed foods. However, in recent years, an increasing number of consumers favor a reduced amount of meat or foods free of meat, fish, shrimp, egg, and the like due to allergy, for religious reasons, or because of consciousness to health maintenance or environmental load. Substitute foods made of seasoned minced soybean are known as such products, however, present problems such as texture or bean odor has existed.

On the other hand, attempts have also been made to use gelling agents as a replacement for foods. Among others, granular gels containing curdlan as a base compound are known to have heat resistance and to be available as imitation foods (patent documents 1 and 2). However, these granular gels containing curdlan as a base compound are gels that are formed by a dropping method. Therefore, the size or shape of such a granular gel is unambiguously determined depending on the bore of a dropping nozzle or a dropping rate, and non-uniform Soboro-like granules cannot be obtained at once. A further problem thereof is that the obtained granular gel cannot be secured as a robust granular gel unless subsequently heated.

PRIOR ART DOCUMENTS

Patent Documents

Patent Document 1: Japanese unexamined Patent Application Publication No. 2000-166490

Patent Document 2: Japanese unexamined Patent Application Publication No. 08-080166

SUMMARY OF THE INVENTION

Object to be Solved by the Invention

An object of the present invention is to provide a method by which a granular solid composition that can be used as a replacement for a Soboro-like food, has non-uniform granule sizes, and has particle surface asperities can be produced at once without mixing afterward granular solids obtained with different granule sizes.

Means to Solve the Object

The present inventors have conducted diligent studies to attain the object and consequently completed the present invention by finding that the object can be attained by heating a liquid or sol composition comprising curdlan on a surface with stirring. Since the granular solids obtained according to the present invention are firmly solidified by heating in a state having non-uniform particle sizes and having surface asperities, a Soboro-like granular solid composition can be conveniently produced.

Specifically, item 1 of the present invention is a method for producing a granular solid composition, comprising a step of solidifying a liquid or sol composition comprising curdlan by heating on a surface with stirring.

Item 2 is the method for producing a granular solid composition according to the above item 1, wherein a curdlan concentration of the liquid or sol composition comprising curdlan is 2 to 10%.

Item 3 is the method for producing a granular solid composition according to the above item 1 or 2, wherein the liquid or sol composition comprising curdlan is a composition comprising a protein.

Item 4 is the method for producing a granular solid composition according to any one of the above items 1 to 3, wherein the step of solidifying by heating on a surface with stirring is the step of setting a thickness such that a liquid level height on the surface becomes 0.05 to 1.0 cm, and solidifying by heating on the surface with stirring.

Item 5 is a liquid or sol composition for use in the preparation of a granular composition comprising 2 to 105 of curdlan and a microbe-derived and/or plant-derived protein.

Other aspects of the present Invention provide a liquid or sol composition comprising 2 to 10% of curdlan and a microbe-derived and/or plant-derived protein for use in the preparation of a granular solid composition, use of the composition, and use of a liquid or sol composition comprising 2 to 10% of curdlan and a microbe-derived and/or plant-derived protein in the preparation of a granular solid composition.

Effect of the Invention

Use of the production method of the present invention can provide a method capable of efficiently producing a granular solid composition that has non-uniform granule sizes, has particle surface asperities, and can be used as a replacement for a Soboro-like food.

BRIEF DESCRIPTION OF DRAWINGS

FIG. 1 is photographs of the appearances of granular solid compositions obtained in Example 1. Curdlan concentrations are 2%, 3%, and 4% from the left toward the right in the upper photographs and are 6%, 8%, and 10% from the left toward the right in the lower photographs.

FIG. 2 is photographs of the appearances of granular solid compositions and a granular solid food raw material liquid obtained in Example 3. The left photographs show the granular solid compositions of Examples 3-1 and 3-2 in order, and the rightmost photograph shows a liquid composition for use in the preparation of the granular solid composition of Example 3-2.

MODE OF CARRYING OUT THE INVENTION

The curdlan according to the present invention is a generic name for heat-coagulable polysaccharides composed mainly of β-1,3-glucoside bonds. The curdlan may be produced by, for example, a microbe of the genus *Alcaligenes* or the genus *Agrobacterium*, and a commercially available product can be suitably used.

The liquid or sol composition comprising curdlan for use in the present invention (hereinafter, referred to as the composition for use in the present invention) can comprise the curdlan in an aqueous solvent, and the curdlan is not necessarily required to be dissolved. The composition for use in the present invention may not have polysaccharides other than curdlan as essential components. The curdlan is insoluble in water and may be in a state dispersed in water without being dissolved, or may be in a liquid state that has become colloidal by high-speed stirring using a mixer or the like. Preferably, high-speed stirring is performed because the curdlan becomes homogeneous in a liquid. The curdlan can be dissolved using an alkali agent and may therefore be dissolved together with the alkali agent. In the case of dissolving the curdlan using the alkali agent, the solution needs to be neutralized into pH 10 or lower with an acid such as an organic acid or an acidic seasoning before heating. A sol state that is not completely solidified, though gelling has started by dispersion in hot water or the like, or a sol having fluidity to the extent that the sol can be spread on a surface may be used as the composition for use in the present invention.

The concentration of the curdlan in the composition for use in the present invention can be arbitrarily set depending on the texture of the grains of the granular solid composition obtained by the method of the present invention, and is preferably in the range of 2 to 1.0%, particularly preferably 2.5 to 7%, further preferably 3 to 6% at which the resulting granular solid composition has Soboro-like texture.

The composition for use in the present invention may appropriately comprise a protein, a food material such as a seasoning or a spice, a polysaccharide thickener, dextrin, processed starch, oil and fat, a storage life-improving agent, an ethanol preparation, a food additive, and the like for the purpose of, for example, improving or adjusting flavor or texture, fortifying nutrients, or improving a storage life, or may not comprise these components, without inhibiting the effect of the present invention. In the case of comprising these components, the components may be added at any time before heating or after the start of heating as long as the time is before the composition of the present invention is solidified as a granular composition. In the case of comprising a protein, any one or more of proteins of various origins such as various animal-derived, plant (e.g., beans and cereals)-derived, and microbe (e.g., algae, yeasts, and basidiomycetes)-derived proteins may be used. Particularly, a microbe-derived or plant-derived protein can be selected from the viewpoint of allergy, calorie reduction for health, the avoidance of animal proteins for reduction in environmental load, etc. in this case, the content of the protein in the composition for use in the present invention can be arbitrarily set.

The microbe-derived or plant-derived protein refers to a microbe- or plant-derived protein that has purified to some extent and has undergone component separation, not a paste obtained directly from a microbe or a plant by physical grinding or the like. Detailed examples of the origin raw material can include a bean such as soybean, pea, chickpea, broad bean, mung bean, kidney bean, and lentil, a cereal such as wheat (gluten), barley, rice, maize, and quinoa, an alga such as chlorella and euglena, a yeast such as bakery yeast and torula yeast, and a basidiomycete such as mycelium of edible mushrooms. Among them, a bean protein is preferred because the resulting granular solid composition brings about Soboro-like texture. A soybean, pea, chickpea, broad bean, or mung bean-derived protein is particularly preferred.

In the case of mixing the composition for use in the present invention with a microbe-derived and/or plant-derived protein or other components, it is preferred to add curdlan to water to preliminarily disperse or dissolve the curdlan, followed by the addition of such an additional component, because the curdlan is easily mixed with the additional component.

The granular solid composition of the present invention can be produced by solidifying the composition for use in the present invention by heating with stirring on a surface. The surface may be a flat surface such as an iron plate, a frying pan, or a baking dish, or may be a curved surface such as a shallow bowl or a round-bottom pot or pan as long as the composition for use in the present invention can be spread on the surface thereof. When quick stirring is performed so as to collapse clumps of the spread liquid or sol composition in heating the composition for use in the present invention on the surface, the composition is solidified in non-uniform granular forms.

The amount of the composition for use in the present invention is preferably an amount by which the thickness of the composition spread on the surface is from a thickness equivalent to crepe dough to a thickness at which the temperature of the whole composition becomes uniform in a short time, for example, an amount that attains a thickness at which a liquid level height on the surface is 0.05 to 1.0 cm, preferably on the order of 0.1 to 0.7 cm, because the stirring of the composition and the heating for solidification can be efficiently performed at the same time.

Although depending on stirring intensity or a curdlan concentration, too large a thickness might cause the composition to be solidified without being granulated, whereas too small a thickness might cause solidification to proceed too faster than the shredding of solids.

In the stirring, any instrument may be used which may be a rod-shaped instrument such as cooking chopsticks or a stirring bar, may be a sheet-shaped instrument such as a spatula or a stirring blade, or may be an instrument having a linear/planar or curved-line/curved-surface rod moiety or sheet moiety, or a combination, as long as the composition for use in the present invention spread on the surface can be mixed while continuously or intermittently heated on the surface from the start of solidification to the solidification.

The heating method may be any method as long as the method can heat the liquid or sol composition comprising curdlan spread on the surface to the extent this composition can be solidified with stirring. Examples thereof include heating by direct fire or electric heat from below the surface, and boiling in hot water. The heating temperature is desirably 80° C. or higher from the viewpoint of the solidification of curdlan.

The composition thus obtained by heating with stirring on a surface forms a thermally irreversible gel by heating to 80° C. or higher and becomes a granular solid composition having non-uniform granule sizes and having surface asperities by stirring. The composition may be directly used as the granular solid composition of the present invention in a food, or may be further cooked for use. The composition can also be used as a material for other foods in various cooks. For example, the granular solid composition of the present invention is applicable as a Soboro-like food to various foods and is also available as a food of non-animal origin such as an allergy-free food or a vegan diet depending on the type of the protein used in combination therewith.

Hereinafter, the present invention will be specifically described with reference to Examples. However, the technical scope of the present invention is not limited by these Examples.

The curdlan used in the following Examples was finely pulverized curdlan from Mitsubishi Corporation Life Sciences Ltd.

Example 1

Curdlan was added to water at a curdlan concentration of 2%, 3%, 4%, 6%, 8%, or 10%, and dispersed by high-speed stirring with a mixer to provide a curdlan dispersion. The curdlan dispersion was spread on a heated frying pan to form a thin film having a liquid level on the order of 0.1 to 0.5 cm, and the curdlan was solidified with stirring of the whole using cooking chopsticks to obtain a granular solid composition.

All the obtained granular solid compositions were Soboro-like granules having non-uniform granule sizes and having surface asperities. The granular solid compositions were collections of smaller grains with decrease in amount of curdlan, and the proportion of large grains was higher with increase in amount of curdlan. Photographs showing the respective appearances of the granular solid compositions are shown in FIG. 1.

Example 2

Curdlan was added to water at a curdlan concentration of 4%, and dispersed by high-speed stirring with a mixer to provide a curdlan dispersion. This dispersion was placed in a beaker such that a liquid level was approximately 0.5 cm. While the beaker was boiled in hot water of 95° C., the curdlan was solidified by stirring to obtain a granular solid composition. The obtained granular solid composition was fine Soboro-like granules having surface asperities.

Example 3

Curdlan, a plant-derived protein, water, and other optional materials were prepared according to the formulation shown in Table 1. The protein used was a chickpea protein (CP-AC manufactured by Organo Foodtech Corp.) in Example 3-1 and a pea protein (PP-CS manufactured by Organo Foodtech Corp.) in Example 3-2. The curdlan was added to water and dispersed by high-speed stirring to prepare a colloidal liquid, to which the protein and further, other materials for Example 3-2 were then added. The mixture was stirred to obtain a liquid composition for use in the preparation of a granular solid composition. Each composition was spread on a frying pan such that a liquid level was on the order of 0.1 to 0.5 cm. The composition was baked with stirring using cooking chopsticks to obtain a granular food.

TABLE 1

| | Example 3-1 | Example 3-2 |
|---|---|---|
| Curdlan (% by mass) | 4.0 | 4.0 |
| Protein | 11.8 | 10 |
| Water | 88.2 | 75 |
| Others Salad oil | — | 10 |
| Emulsifier | | 0.5 |
| Salt | | 0.5 |

All the obtained granular solid compositions were, as shown in the photographs of FIG. 2, granules having non-uniform granule sizes and having surface asperities, had a Soboro-like appearance, and offered a chewy texture as a result of actual eating.

INDUSTRIAL APPLICABILITY

By use of the production method of the present invention, a Soboro-like granular solid composition can be obtained, and a Soboro-like food free of meat, seafood, egg, and the like can be provided for health or religious reasons or in consideration of SDGs.

The invention claimed is:

1. A method for producing a granular solid food composition having non-uniform granule sizes and having particle surface asperities, comprising:
- a step of preparing a liquid or sol composition comprising 2 to 10% by mass curdlan;
- a step of placing the liquid or sol composition on a surface; and
- a step of solidifying the liquid or sol composition by heating on the surface with stirring, to produce the granular solid food composition.

2. The method for producing a granular solid food composition according to claim 1, wherein the liquid or sol composition further comprises a purified protein.

3. The method for producing a granular solid food composition according to claim 1, wherein the step of placing the liquid or sol composition on the surface comprises placing an amount of the liquid or sol composition to provide a liquid or sol level height on the surface of 0.05 to 1.0 cm.

4. The method for producing a granular solid food composition according to claim 2, wherein the step of placing the liquid or sol composition on the surface comprises placing an amount of the liquid or sol composition to provide a liquid or sol level height on the surface of 0.05 to 1.0 cm.

5. The method for producing a granular solid food composition according to claim 1, wherein the granular solid food composition is free of egg.

6. The method for producing a granular solid food composition according to claim 1, wherein the granular solid food composition is free of at least one member selected from the group consisting of meat, seafood, and egg.

7. The method for producing a granular solid food composition according to claim 1, wherein the liquid or sol composition comprises 2.5 to 7% by mass curdlan.

8. The method for producing a granular solid food composition according to claim 1, wherein the granular solid food composition comprises at least one member selected from the group consisting of a protein; a polysaccharide thickener; dextrin; processed starch; oil and fat.

* * * * *